Aug. 12, 1930.  T. E. FOULKE  1,772,562
CURRENT RECTIFIER AND VOLTAGE REGULATOR
Filed Jan. 14, 1927
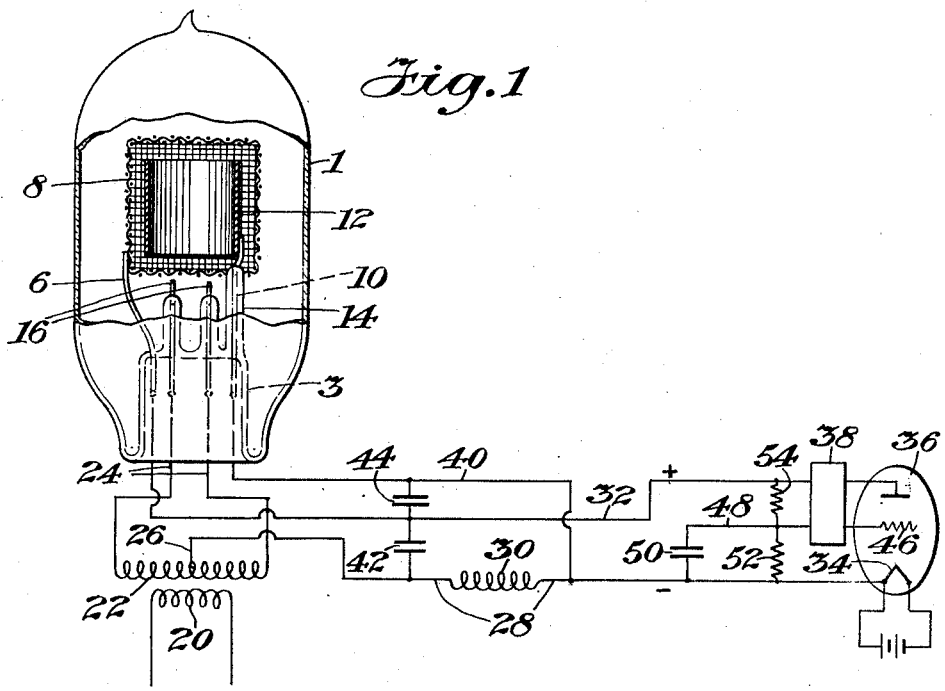
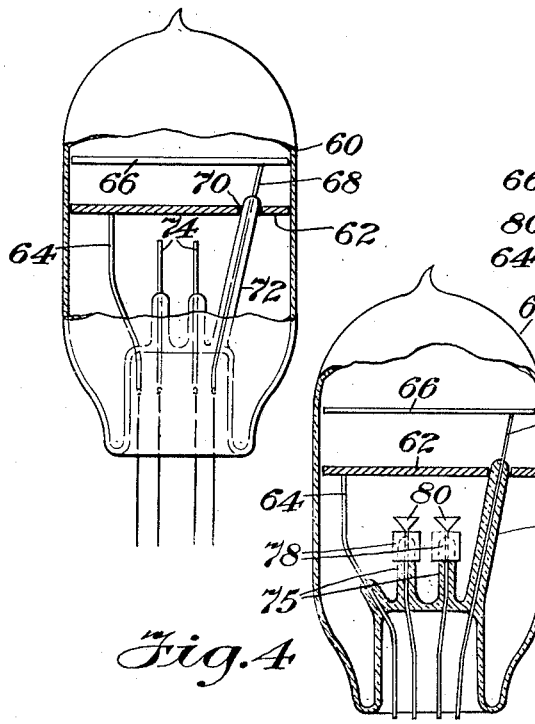
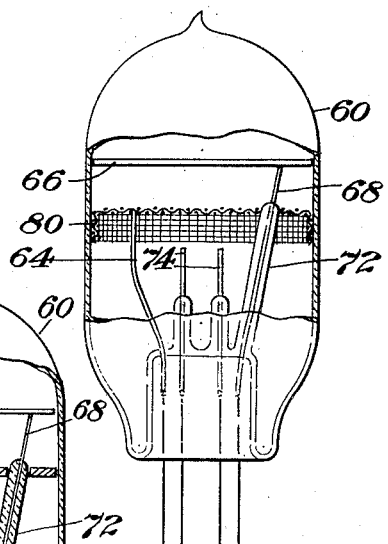
INVENTOR
Ted E. Foulke
BY
HIS ATTORNEY Patented Aug. 12, 1930

1,772,562

UNITED STATES PATENT OFFICE

TED E. FOULKE, OF NUTLEY, NEW JERSEY, ASSIGNOR TO GENERAL ELECTRIC VAPOR LAMP COMPANY, OF HOBOKEN, NEW JERSEY, A CORPORATION OF NEW JERSEY

CURRENT RECTIFIER AND VOLTAGE REGULATOR

Application filed January 14, 1927. Serial No. 161,130.

My present invention relates to electrical devices for controlling the flow of electrical currents through influence of characteristics of the ionic conduction of currents between solid or liquid electrodes in gases or vapors. The invention relates more particularly to an ionic device for converting alternating currents into a rectified current and for regulating the voltage of the rectified current to maintain it within given and comparatively narrow limits. The invention also relates to systems of electrical distribution including a device of the kind above described.

Various other objects and advantages of the invention will be obvious from the following particular description of forms of ionic devices and electrical circuits embodying the invention or from an inspection of the accompanying drawings; and the invention also consists in certain new and novel features of construction and combinations of parts hereinafter set forth and claimed.

In the accompanying drawings I have shown for purposes of illustration certain forms of devices and electrical circuits embodying the invention, in which Fig. 1 is a diagrammatic view in elevation and part section of an embodiment of the ionic device of the invention together with a system of electrical distribution, Figs. 2, 3 and 4 are diagrammatic views in elevation and part section of alternative forms of ionic devices embodying the invention.

Like reference characters denote like parts in the several figures of the drawings.

According to the invention a single electrode element is used for two separate functions and forms a part of two different combinations of elements. One of these combinations has the function of rectifying an alternating current and the other combination has the function of regulating the voltage of the rectified current. In the first combination the element with the dual function serves as a cathode in a point to plate ionic rectifier and in the other combination this element serves as the anode in an electronic glow discharge type of voltage regulator. Between the plate and point of the rectifier combination there is provided a suitable atmosphere of gas or vapor such as mercury, argon, helium neon and between the glow discharge voltage regulator elements there is provided an atmosphere of a suitable gas or vapor, but preferably means are arranged for preventing gaseous conduction between the rectifier points and the voltage regulator cathode. Such conduction preventing means in some cases permit of pressure equalization between the atmosphere in two spaces. The atmosphere of the rectifier space and the atmosphere of the regulator space are composed of the same gases or vapors or mixtures thereof, and at the same or different pressures.

A preferred embodiment of the invention is shown in Fig. 1 of the drawing in which the sealed envelope 1 has the sealed-in neck 3 which supports the sealed-in lead 6 which carries the hollow electrode 8 which serves both as rectifier cathode and as regulator anode and which is closed in on all sides. This electrode 8 is of wire mesh in which the meshes are spaced apart at a distance preferably not greater than the length of the mean free path of electrons in gases or vapors in said envelope 1. A lead 10 sealed through neck 3 extends through an opening in said electrode 8 and supports therein the regulator cathode 12 in the form of a hollow cylinder open at the ends. A sleeve 14 of glass is sealed to said neck 3 and extends therefrom and completely over said lead 10 and into said hollow electrode from which it can be spaced at a distance preferably not greater than said mean path of electrons. Said stem 14 also insulates said lead 10 from gases in the space of said envelope which is outside said electrode 8. Said electrode 12 when desired is made of solid or perforated sheet metal instead of wire mesh. Electrode leads 16, sealed through said neck 3 terminate in said envelope 1 and outside said electrode 8 at a distance therefrom with respect to gas or vapor pressure in the device to function therewith as the anodes of a point to plate rectifier of the half or full wave form according to the electrical connections made thereto. The electrodes 8, 12, and 16, can be of nickel, iron, tungsten or other suitable material.

As shown in Fig. 1 the transformer primary 20 can be connected to a suitable source of alternating or interrupted current and is in operative relation to the secondary 22 which latter has outer taps 24, which connect to respective ends of said leads 16. A tap lead 26 connects from an intermediate point in said transformer secondary 22 to a work circuit main 28 which has an inductance 30 in series therein. A cooperating work circuit main 32 is connected to said lead 6 of said electrode 8. Said main 28 connects to one side of a filament 34 of a three element electron tube 36 which is connected in the circuit of the diagrammatically indicated radio receiving set 38. A lead 40 connects said lead 10 of electrode 12 to said lead 28 at a point between said inductance 30 and filament 34. From a point between the secondary 22 and said inductance 30 a condenser 42 is connected across from main 28 to said main 32, and a condenser 44 is connected across said main 32 and said lead 40. A lead 48 connects from a point on main 28 outside the tap in of lead 40 through a condenser 50 to said radio set 38 and a resistance 52 is connected in parallel with said condenser 50. A resistance 54 is shunted from a point on lead 48 between condenser 50 and set 38 to said work main 32. These elements, namely, the inductance 30, condensers 42, 44, and 50 and resistances 52 and 54 in the system serve as a filter to smooth off and further regulate the rectified current as it is produced by the regulator rectifier of said tube 1.

In the preferred embodiment of the invention an atmosphere is provided therein of helium, neon, argon or mercury vapor, and a getter of alkaline metal such as lithium, sodium or magnesium is provided in the envelope 1 to purify and to keep pure the atmosphere of the device.

In a device whose parts have dimensions comparable to those of similar ionic devices in general use on currents of similar values a device embodying the invention in the form illustrated in Figure 1, having magnesium as a getter and an atmosphere of helium at a pressure of about 10 millimeters of mercury will rectify an alternating current of a value up to about 150 milliamperes at a voltage at definite values between 80 and 250 and will regulate the rectified voltage within narrow limits, namely within ½ to 5 volts between no load and full load. A similar device with sodium as a getter and with an atmosphere of about 10 millimeters of helium or of about 6 to 7 millimeters of neon and alternating current voltages between about 180 to 260 will rectify and will control the voltage of the rectified current to keep it within narrow limits on either side of about 100 volts. In the making of the device illustrated in Fig. 1 the getter is applied by placing original getter material within said cage 8. The interior of the tube is heated during the exhausting of the tube preliminary to filling it with its operating atmosphere by producing a glow discharge between the electrodes 8 and 12 or by placing the device within the influence of a high frequency inductive heater. The heating of the device at this stage clears the material of the electrodes and of the envelope and other parts of gases and at the same time the getter material is heated and vaporized, the metal thereof passing to and depositing itself over the interior of electrode 12 and onto the mesh of electrode 8 and also passes through the minute openings of said electrode 8 to the space outside thereof whereby it passes to and is deposited on the electrodes 16. The getter material from which the getter is distilled or vaporized is of such material as lithium, sodium or magnesium in the metal form.

The embodiment of the invention illustrated in Fig. 2 comprises the sealed envelope 60 which has a filling of a gas or vapor the chamber of said envelope being divided transversely by the plate electrode 62 which serves as rectifier cathode and regulator anode and which extends closely toward the sides of said envelope 60, preferably spaced therefrom at a distance not greater than the mean free path of electrons in the atmosphere of the device during operation. A sealed-in lead 64 supports said electrode 62 in position and serves as a conductor therefor. Above said electrode 62 and, in the form shown, parallel therewith is the regulator cathode plate 66 which has a supporting lead-in 68 which extends through an opening 70 in said plate 62. A sleeve of glass 72 on said lead 68 extends from the seal-in point of the lead to a point between said plates 62 and 66 and insulates said lead from the gases in the space below plate 62. The said sleeve 72 is preferably spaced from the sides of said opening 70 at a distance not greater than the length of said mean free path of electrons during operation. In the space on the opposite side of said plate 62 from said plate 66 are the two rectifier point electrodes 74, sealed into the tube.

The embodiment illustrated in Fig. 3 is similar to that of Fig. 2 except that in place of said plate electrode 62 there is used an electrode 80 of wire mesh in the form of a shallow cup the sides of which fit against the inside of said envelope 1.

In the use and operation of the embodiments of the invention herein illustrated and described as for example in the electrical circuit of Fig. 1, the alternating current passing from said secondary 22 is rectified through the anodes 16, and the rectifier cathode 8, the current connection being tapped from an intermediate point on said secondary 22 to the work circuit 28. The return circuit is from said rectifier cathode 8 through lead 6 to said work circuit main 32. The electrode 12 through lead 10 is connected to said work circuit main 28 and during operation of the device a glow discharge is maintained between said electrodes 8 and 12 to regulate the voltage of the work circuit.

In Fig. 4 is illustrated a variation of the embodiment of Fig. 2 in which the rectifier anode lead-in stems 75, have mounted on their upper ends the caps 78, of lavite or other insulating material, the tops of said caps being flat. The anode terminals 80, are also flattened out on top and have a conical undersurface which tapers inwardly from their top to the top of a respective cap 78 to which the conical surface extends. The distance from the edge of the top of an electrode 80 to the top of its respective cap 78 is preferably not greater than the mean free path of electrons in the gas or vapor of the device during operation. The depth of the annular channel under the edge of the anode terminals is greater than the greatest width thereof and preferably not less than the length of effective ionizing paths of electrons in the gas or vapor within the device during operation. This provides that said insulators 78, will not be bombarded at their parts immediately adjacent said anodes 80, by electrons during discharges in the device because any electrons which are drawn and pass into the neighborhood thereof will be drawn by the potential to said anodes and there will be discharged or neutralized.

In the normal operation of the device as a rectifier a constant higher voltage is supplied at the rectifier leads than is needed in the direct current circuit to compensate for voltage drop in the filter system due to the current resistance losses therein. Heretofore if for any reason the amount of current drawn in the direct current circuit is decreased, this normal voltage drop in the filter system decreases and consequently the voltage on the direct current supply rises correspondingly. Because abnormal voltage rise on amplifier tubes and so forth is deleterious to their operation, there is connected across this direct current supply load the regulator anode 8 and regulator cathode 12 which is designed and adjusted to pass current at the predetermined maximum voltage condition allowable in the amplifier system, thereby increasing the current through the filter system, thus restoring the current-resistance drop to a normal value and maintaining the voltage at this predetermined maximum break down value between the regulator anode and regulator cathode.

It is to be understood that the devices used herein as illustrative examples can be used for single or double wave rectification and that they can be used for either voltage regulation or current rectification alone.

While I have shown and described and have pointed out in the annexed claims certain novel features of the invention, it will be understood that various omissions, substitutions and changes in the forms and details of the device illustrated and in its operation may be made by those skilled in the art without departing from the spirit of the invention.

This application is a continuation, in part, of my co-pending application Serial Number 155,382, filed December 17, 1926.

I claim:

1. In a gaseous electric discharge device, a sealed envelope, a gaseous filling in said envelope, a rectifier anode terminating in the gas in said envelope, a sealed-in lead for said anode, a rectifier cathode in said gas and in operative relation to said anode, a sealed-in lead for said cathode, a voltage regulator cathode in said envelope, said rectifier cathode separating said rectifier anode from said regulator cathode against gaseous conduction of electricity therebetween, and a sealed-in lead for said regulator cathode insulated against gaseous conduction of electricity with said anode.

2. In a gaseous electric discharge device, a sealed envelope, a gaseous filling in said envelope, rectifier anodes terminating in the gas in said envelope, a sealed-in lead for each of said anodes, a rectifier cathode in said gas and in operative relation to said anodes, a sealed-in lead for said cathode, a voltage regulator cathode in said envelope, said rectifier cathode being in the form of a cage about said regulator cathode to prevent gaseous conduction of electricity between it and said rectifier anodes, and a sealed-in lead for said regulator cathode insulated against gaseous conduction of electricity with said anodes.

3. In a vapor electric discharge device, a sealed envelope, a rectifier cathode separating said envelope into two chambers, a sealed-in lead for said rectifier cathode, rectifier anodes in one of said chambers and in operative relation to said cathode with sealed-in conductors therefor, an electrode in the other of said chambers in operative relation to said rectifier cathode, a sealed-in conductor for the last said electrode insulated against conduction of electricity thereto from first said chamber, and a gaseous filling for said chambers.

4. In a combination current rectifier and rectified current voltage regulator, in combination, a sealed envelope, a combination rectifier cathode and regulator anode which separates said envelope into two chambers, a sealed-in conductor for said combination electrode, a gaseous filling in each of said chambers, rectifier anodes in one of said chambers in operative relation to said combination electrode, a sealed-in conductor for each of said anodes, a regulator cathode in said other chamber and in glow discharge relation to said combination electrode, a sealed-in conductor for said regulator cathode, separated against gaseous electrical conduction from said anodes.

5. In a combination current rectifier and rectified current voltage regulator, in combination, a sealed envelope, a combination rectifier cathode and regulator anode which separates said envelope into two chambers, a sealed-in conductor for said combination electrode, a gaseous filling in each of said chambers, rectifier anodes in one of said chambers in operative relation to said combination electrode, a sealed in conductor for each of said anodes, a regulator cathode in said other chamber and in glow discharge relation to said combination electrode, a sealed-in conductor for said regulator cathode extending through said combination electrode and electrically insulated therefrom and separated against gaseous electrical conduction from said anodes.

6. In a gaseous electric discharge device, a sealed envelope forming a current rectifier chamber with a gaseous atmosphere therein, rectifier anodes terminating in said chamber, a current rectifier cathode in said chamber and in operable relation to said rectifier anodes, said cathode enclosing and separating a second chamber from said rectifier chamber against gaseous electrical conduction between the two chambers, a sealed-in conductor for said rectifier cathode, a regulator cathode in said second chamber in operative relation to said rectifier cathode for glow discharge voltage regulation therebetween, a gaseous filling in said second chamber, and a sealed-in conductor for said regulator cathode separated against gaseous electrical conduction between it and said rectifier anodes.

7. In a gaseous electric discharge device, a sealed envelope forming a current rectifier chamber with a gaseous atmosphere therein, rectifier anodes terminating in said chamber, a current rectifier cathode in said chamber and in operable relation to said rectifier anodes, said cathode separating the second chamber from said rectifier chamber against gaseous electrical conduction between the two chambers, a sealed-in conductor for said rectifier cathode, a regulator cathode in said second chamber in operative relation to said rectifier cathode for glow discharge voltage regulation therebetween and a sealed-in conductor for said regulator cathode separated against gaseous electrical conduction between it and said rectifier anodes.

Signed at Hoboken, in the county of Hudson and State of New Jersey this 12th day of January A. D. 1927.

TED E. FOULKE.